(12) United States Patent
Hill

(10) Patent No.: US 7,444,780 B2
(45) Date of Patent: *Nov. 4, 2008

(54) METHOD AND APPARATUS FOR CONVERTING SPENT WATER-BASED DRILLING MUDS INTO FERTILE INDIGENOUS TOP SOIL

(76) Inventor: Houston E. Hill, 2312 N. W. 56th Ter., Oklahoma City, OK (US) 73112

( * ) Notice: Subject to any disclaimer, the term of this patent is extended or adjusted under 35 U.S.C. 154(b) by 0 days.

This patent is subject to a terminal disclaimer.

(21) Appl. No.: 11/801,511

(22) Filed: May 10, 2007

(65) Prior Publication Data

US 2007/0214715 A1 Sep. 20, 2007

Related U.S. Application Data

(60) Continuation of application No. 11/650,906, filed on Jan. 8, 2007, which is a division of application No. 10/922,254, filed on Aug. 19, 2004, now abandoned.

(60) Provisional application No. 60/496,590, filed on Aug. 20, 2003.

(51) Int. Cl.
| | |
|---|---|
| *A01G 9/10* | (2006.01) |
| *C12M 1/00* | (2006.01) |
| *B09B 1/00* | (2006.01) |
| *C09K 8/02* | (2006.01) |

(52) U.S. Cl. .............................. 47/58.1 SC; 435/289.1; 405/128.1; 175/66; 47/59 S

(58) Field of Classification Search ................ 47/59 S, 47/1.42, 58.1 SC; 435/290.1, 290.2, 289.1; 405/128.1, 128.75; 71/11; 175/66; 507/100, 507/110

See application file for complete search history.

(56) References Cited

U.S. PATENT DOCUMENTS

| | | | |
|---|---|---|---|
| 2,761,838 A | * | 9/1956 | Brown et al. ............... 507/240 |
| 3,777,405 A | | 12/1973 | Crawford |
| 4,079,003 A | | 3/1978 | Manchak |
| 4,181,494 A | | 1/1980 | Kimberley |
| 4,184,771 A | | 1/1980 | Day |
| 4,208,285 A | | 6/1980 | Sample, Jr. |
| 4,209,381 A | | 6/1980 | Kelly, Jr. |
| 4,348,279 A | | 9/1982 | Tikhonov et al. |

(Continued)

FOREIGN PATENT DOCUMENTS

GB 2215364 A 9/1989

*Primary Examiner*—Andrea M Valenti
(74) *Attorney, Agent, or Firm*—Dunlap Codding, P.C.

(57) ABSTRACT

A method and apparatus for converting spent water-based drilling mud into fertile indigenous top soil at a well site or location. The fertile indigenous top soil is produced by the steps of: admixing, at a well site, effective amounts of spent water-based drilling mud, mature compost, organic fertilizer, and top soil from the well site to provide a mixture containing spent water-based drilling mud, from about 30 to about 150 volume percent mature compost, from about 5 to 20 volume percent organic fertilizer, and from about 5 to 20 volume percent top soil from the well site wherein each of the volume percents is based on the volume of the spent water-based drilling mud present in the mixture; stirring the mixture for a period of time effective to form a substantially homogenous mixture; and drying the substantially homogenous mixture so as to provide fertile indigenous top soil possessing similar microbial and enzyme characteristics as the top soil at the well site.

4 Claims, 4 Drawing Sheets

U.S. PATENT DOCUMENTS

| | | |
|---|---|---|
| 4,387,514 A | 6/1983 | McCaskill, Jr. |
| 4,648,333 A * | 3/1987 | Mudd et al. .................. 507/140 |
| 4,751,887 A | 6/1988 | Terry et al. |
| 5,132,025 A | 7/1992 | Hays |
| 5,362,149 A | 11/1994 | Nelson |
| 5,472,937 A * | 12/1995 | Fleming et al. ............. 507/140 |
| 5,570,749 A | 11/1996 | Reed |
| 5,603,744 A * | 2/1997 | Kurner ........................... 71/9 |
| 5,770,436 A * | 6/1998 | Mayfield .................. 435/262.5 |
| 5,927,970 A | 7/1999 | Pate et al. |
| 6,106,733 A | 8/2000 | Wood |
| 6,381,899 B1 * | 5/2002 | McDole ................... 47/58.1 R |
| 2002/0169082 A1 | 11/2002 | Krosigk |
| 2003/0098180 A1 | 5/2003 | Growcock et al. |
| 2003/0159310 A1 | 8/2003 | Hensley et al. |
| 2003/0167970 A1 | 9/2003 | Polston |

* cited by examiner

METHOD AND APPARATUS FOR CONVERTING SPENT WATER-BASED DRILLING MUDS INTO FERTILE INDIGENOUS TOP SOIL

CROSS-REFERENCE TO RELATED APPLICATIONS

This present application is a continuation of U.S. Ser. No. 11/650,906 filed Jan. 8, 2007 which is a divisional of U.S. Ser. No. 10/922,254 filed Aug. 19, 2004 now abandoned, which claims the benefit under 35 U.S.C. 119(e) of U.S. Provisional Application Ser. No. 60/496,590, filed Aug. 20, 2003. The entire disclosures of both applications are hereby expressly incorporated herein by reference.

FIELD OF THE INVENTION

The present invention relates to treatment of spent water-based drilling muds, and more particularly but not by way of limitation, to treatment of spent water-based drilling muds at a drilling site to convert such spent water-based drilling muds into indigenous fertile top soil.

BRIEF DESCRIPTION OF PRIOR ART

During the drilling of wells to recover oil and gas, it is necessary to circulate a liquid drilling mud down the drill pipe to the bottom of the well bore and up the well bore to the surface. The drilling mud keeps the geologic formation surrounding the well bore in place and enhances and maintains the ability to move the pipe up and down the well bore. Drilling muds of different weights and viscosity are required depending upon the depth of the well, geologic formations encountered and the diameter of a well bore.

The term "drilling mud" is a term of art in the oil field industry and may be more accurately described as a "drilling fluid". Drilling muds can be extremely simple or extremely complex in structure and formulation, depending on where they are used and what they are used for. At the simplest, drilling muds are broken into three general categories: 1) freshwater-based muds, 2) saltwater-based muds and 3) oil-based muds. The present invention is especially designed for converting water-based drilling muds, both freshwater-based and saltwater-based drilling fluids or muds, into indigenous fertile top soil.

By definition, spent water-based drilling mud is waste. Not that it has hazardous levels of contaminates, but rather low to moderate levels of sodium chloride. More than 98% of the total volume of spent water-based drilling mud are just natural ingredients, namely:

1. The liquid based water;
2. Bentonite (clay particles);
3. Barium—a weighting material; and
4. Drilling solids—earth's subsurface.

Operation of rotary drilling equipment involves rotating a drill bit by means of a hollow pipe. The water-based drilling mud is circulated down the hollow pipe, through the bit and back to the surface through an annular space between the outside of the drill pipe and the inside of the drilled hole or casing. The water-based drilling mud performs several different functions in the rotary drilling operation. Examples of some of these functions are: 1) remove formation cuttings from the drilled hole, 2) suspend cuttings during trips, 3) form an impermeable wall cake, 4) prevent caving of the formation, and 5) control formation pressure.

A typical water-based mud system for use in the drilling of oil and gas wells includes a mud holding tank, usually positioned at the well site on or adjacent the drilling rig, and a network of pumps, mixers and mud supply lines that run to and from the well bore. The mud holding tank is used to hold the various dry and liquid components of the drilling mud as they are mixed into a liquid slurry to produce a drilling mud having the desired physical properties and characteristics.

The drilling mud is then pumped from the mud holding tank through the mud supply lines and circulated through the well bore at the desired rate. The spent drilling mud can thereafter be cleaned or reconditioned during the drilling operation or deposited in a mud pit for subsequent removal to a remote disposal site.

Every day, on every oil or gas drilling site, there is produced approximately 63 gallons or one and a half barrels of spent drilling fluid per linear foot of downward drilling. Well over 90% of all drilling mud are water-based drilling fluids, i.e. drilling muds that use water as the liquid base of the drilling mud, rather than oil or diesel. Spent drilling waste requires permits in order to haul off the location and for disposal. The cost of analyzing, hauling and handling of spent drilling fluid waste for disposal is very expensive. The time frame for disposal is easy, a couple of months to a year or so for proper disposal (cradle to grave). Where the waste goes and how it is handled is very important. The liability associated with the process of handling and disposing of drilling fluid waste concerns the government, the public and of course the oil companies and their waste contractors. As long as the oil and gas industry generates large amounts of spent drilling fluid waste, the government, in response to public pressure, refuse to license oil companies to drill on public lands. If a new technology were developed which would provide environmental protection, new energy supplies could be found, without the negative environmental cost. That is, if oil companies could drill for oil and gas and not generate any liquid or solid waste for disposal, the attitude toward oil companies would change overnight. The generation of waste is not the problem, the problem is the disposal of such waste.

The present invention provides environmental technology which turns water-based drilling waste into "fertile indigenous top soil" at the drilling site within hours of the drilling waste being produced. The top soil will be at least as fertile, if not more fertile, than the surrounding soil, and will possess the same biological characteristics as the soil at the well site. The enzymes and microorganisms in the soil present at the well site are already adapted to the specific climate around the well site. Thus, no hauling, no disposal and no long term liability associated with the disposal of the spent water-based drilling fluid.

The fertile, indigenous top soil produced in accordance with the present invention is not just a soil conditioner or additive to topsoil, but is a complete product, in and of itself. Further, the fertile indigenous top soil produced is site specific to each drilling location.

As will be shown hereinafter, the present invention provides a unique and revolutionary method of disposing of spent water-based drilling fluids. The present invention is revolutionary because millions of barrels of waste each year won't be hauled off location to be disposed of.

DETAILED DESCRIPTION OF THE INVENTION

Figure 1:
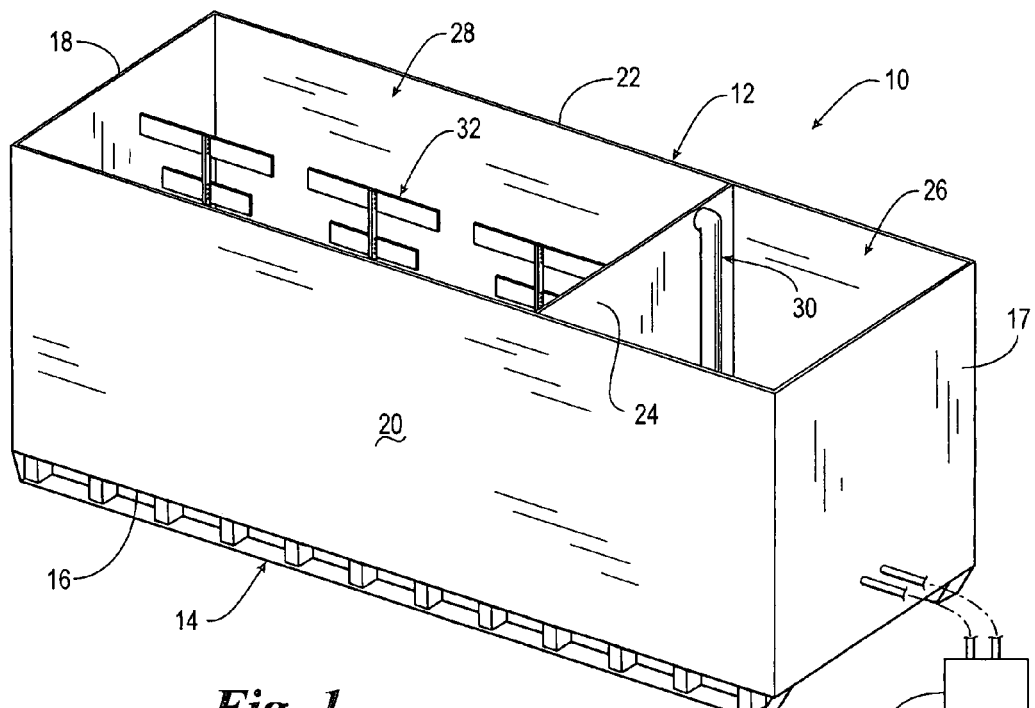
FIG. 1 is a pictorial representation of an apparatus for converting water-based drilling muds into indigenous fertile top soil at a well site in accordance with the present invention.

As previously stated, the present invention relates to a method and apparatus for converting spent water-based drilling muds into fertile top soil at a well site or location. Broadly, the method involves the steps of analyzing the spent water-based drilling mud to determine its pH and the presence of heavy metals, soluble salts such as sodium chloride and hydrocarbons and petroleum products (tph). Thereafter, a plurality of dry ingredients, i.e., a humus material such as mature compost, top soil from the well location and organic fertilizer such as cow manure, chicken manure, pig manure and the like, are admixed with the spent water-based drilling mud to form a substantially homogeneous mixture or slurry. If the viscosity of the homogeneous mixture is too high due to the amount of dry ingredients mixed with the spent water-based drilling mud or the amount of water present in the spent water-based drilling mud, fresh water is added to the mixture until the desired viscosity of the mixture is achieved.

The amount of the mature compost, organic fertilizer and indigenous top soil mixed with the spent water-based drilling mud can vary. However, the mixture will generally contain an effective amount of spent water-based drilling mud, from about 30 to 150 volume percent of mature compost, from about 5 to 20 volume percent organic fertilizer, and from about 5 to 20 volume percent indigenous top soil based on the volume of spent water-based drilling mud present in the mixture. If required, from about 5 to 15 volume percent of gypsum, based on the volume of spent water-based drilling mud present in the mixture, can be incorporated into the mixture in order to break up or reduce the adhesive characteristics of the clay particles.

By incorporating an effective amount of the top soil at the well location with a mixture containing spent water-based drilling mud, mature compost, and the organic fertilizer, an enzyme base is provided in the mixture corresponding with the soil surrounding the well location and the micro-organisms present in the mixture are enhanced so that the hydrocarbon present in the spent water-based drilling mud is consumed by the enzymes while, at the same time, the nitrogen level of the resulting fertile indigenous top soil so produced is increased by the organic fertilizer.

Additional ingredients or components can be introduced into the mixture. For example, if the pH of the spent water-based drilling mud is less than 7, natural material, such as lime (CaO), potassium hydroxide (KOH), and the like, can be added to provide the drilling mud with a higher pH to prevent any heavy metals present in the water-based drilling mud from becoming water soluble and to insure that heavy metals adhere to the clay particles present in the spent water-based drilling mud.

To control and/or reduce the level of water-soluble salts, such as sodium chloride, an effective amount of a liquid product containing calcium, magnesium and/or potassium and which functions as an ion exchange compound can be introduced into the mixture. The minerals present in the liquid product provide a mass ion effect and an ion exchange with the sodium present in the water-soluble salts.

To effect the conversion of the mixture containing the spent water-based drilling mud, compressed air, heated compressed air and/or $O_3$ air (i.e., pure air), can be injected into the mixture in an amount and at a velocity sufficient to substantially saturate the mixture and thereby enhances the activity of the enzymes present in the mixture, as well as to dry the resulting indigenous fertile top soil produced from the mixture.

From the above, it can be appreciated that the process for converting spent water-based drilling mud at the well site into fertile indigenous top soil, utilizes chemical, microbial and physical principles.

Figure 3:
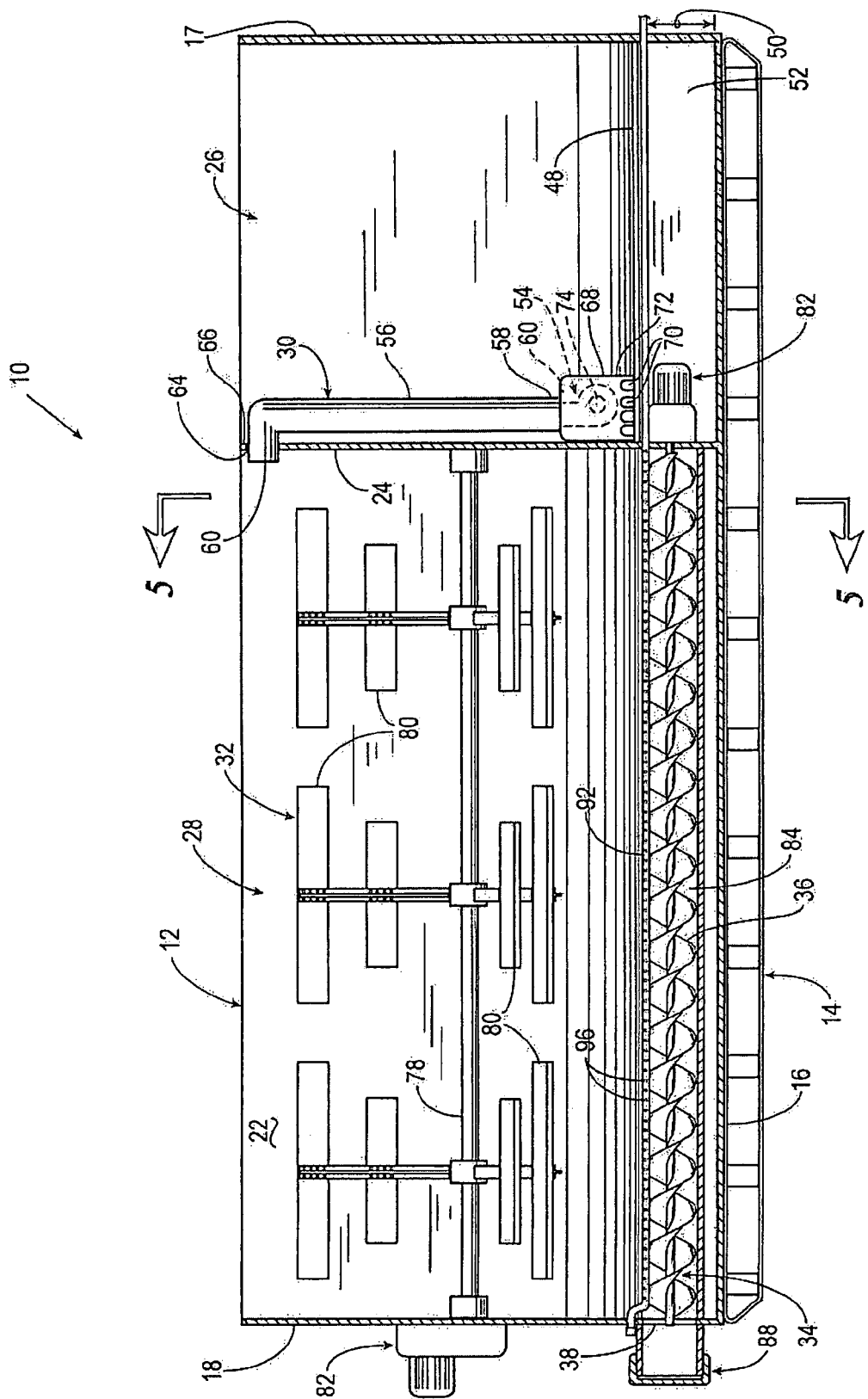
FIG. 3 is a side elevational view of the apparatus of FIG. 1.
Figure 4:
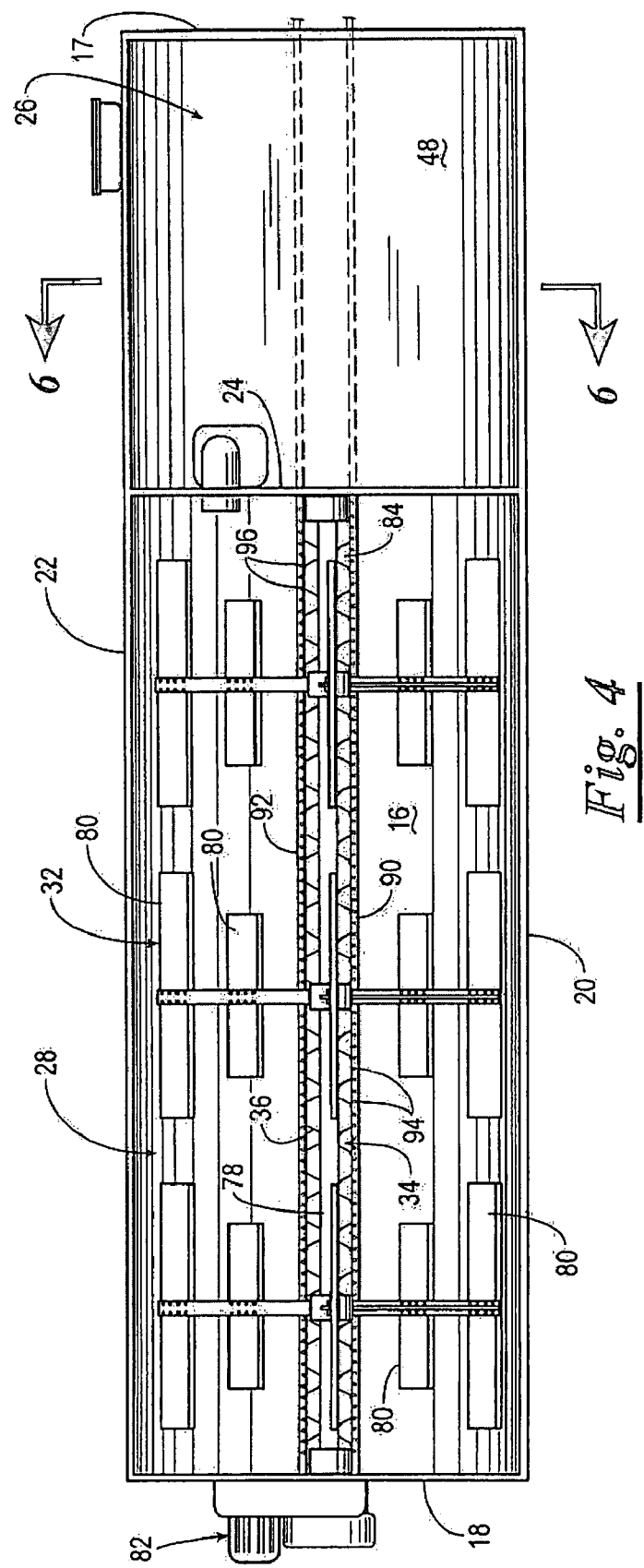
FIG. 4 is a top plan view of the apparatus of FIG. 1.

Referring now to the drawings, and more particularly to FIGS. 1, 3 and 4 shown therein is an apparatus 10 employed in the conversion of spent water-based drilling muds into indigenous fertile top soil at the well site. The apparatus 10 includes a hopper 12 supported on a skid 14 for enhancing movement of the apparatus 10 to a desired location at the well site. While the apparatus 10 has been shown as having the skid 14 connected to a lower portion or bottom 16 of the hopper 12, any suitable structure can be employed in place of the skid 14, such as a plurality of axles and wheels, as long as the structure permits the apparatus 10, and thus the hopper 12, to be easily moved to the desired location at the well site.

The hopper 12 has a first end 17, a second end 18, a first side 20, a second side 22 and the bottom 16. A bulk head or partition 24 is secured in the hopper 12 so as to define a first compartment 26 and a second compartment 28. The first compartment 26, which is adapted to receive the spent water-based drilling mud, is provided with a mud transfer assembly 30; and the second compartment 28, which is designed to receive and treat the spent water-based drilling mud, is provided with a mixing assembly 32 for mixing the spent water-based drilling mud with additional components such as mature compost or humus material, organic fertilizer, and indigenous soil from the well site to convert the spent water-based drilling mud into indigenous fertile top soil utilizing the apparatus 10 and the method herein after described. In certain instance, it may be desirable to employ minor effective amounts of additives to reduce the soluble salt content and/or to increase the enzyme activity of the mixture during conversion of the mixture into indigenous fertile top soil.

Figure 5:
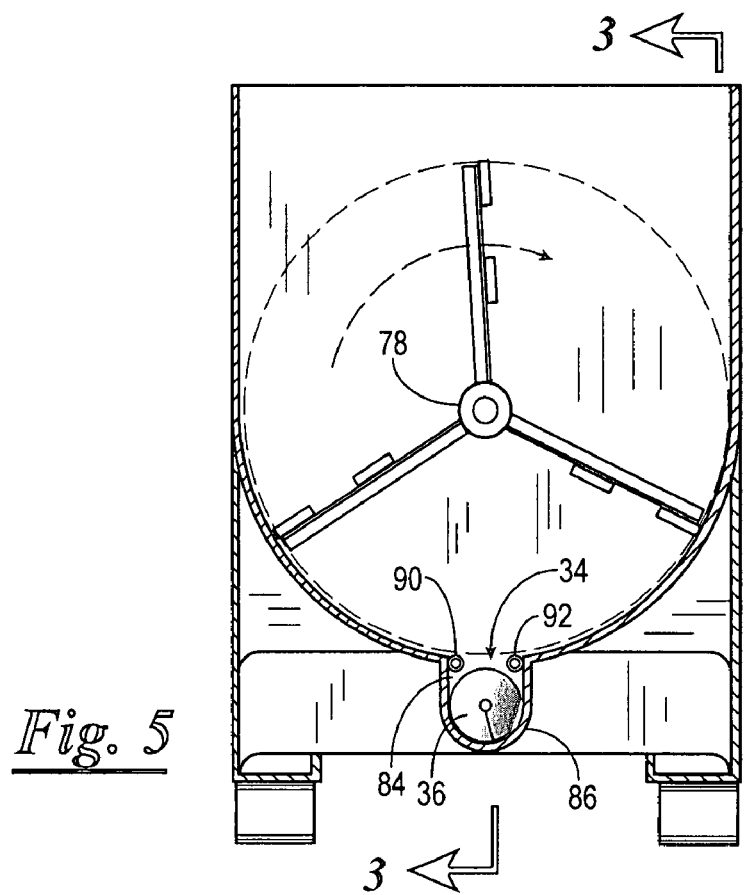
FIG. 5 is a cross sectional view of the apparatus of FIG. 3 taken along the line 5-5 thereof.

As shown in FIGS. 3-5, the apparatus 10 is further provided with a dispensing assembly 34 (FIGS. 3 and 4) which is continuous with the second compartment 28 of the hopper 12. The dispensing assembly 34 includes an auger 36 and an exit opening 38 for discharging indigenous fertile top soil produced from spent water-based drilling mud from the second compartment 28 of the hopper 12.

Figure 2:
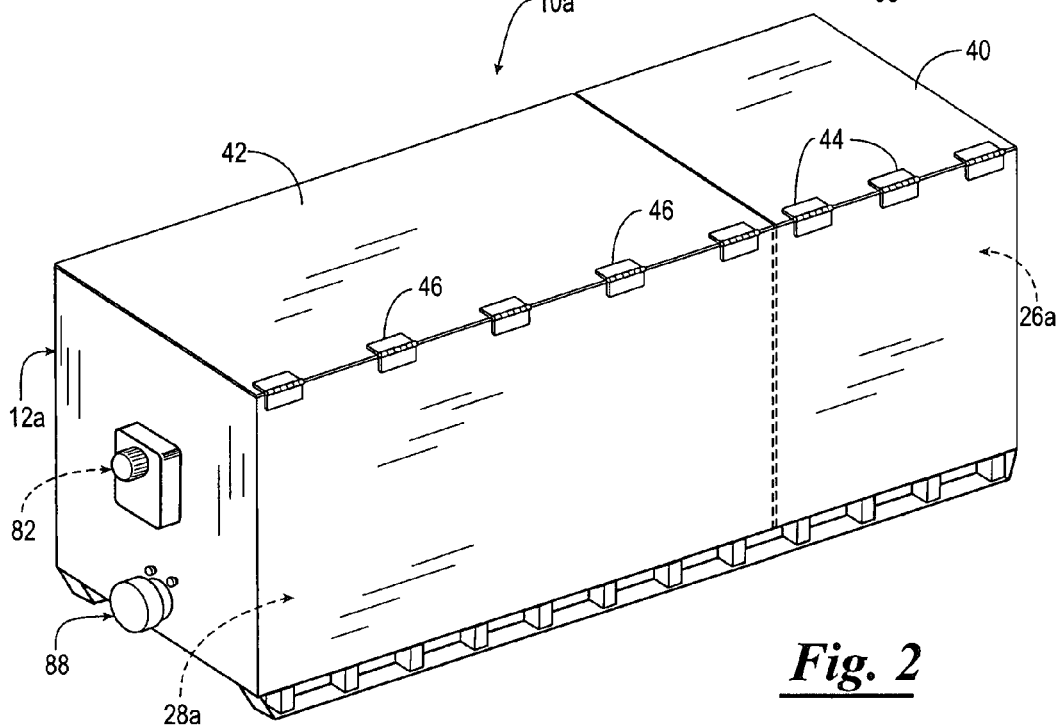
FIG. 2 is a pictorial representation of another embodiment of an apparatus for converting spent water-based drilling muds into indigenous fertile top soil at the well site wherein the apparatus is provided with lids for closing off various compartments of the apparatus.

Shown in FIG. 2 is another embodiment of an apparatus 10a constructed in accordance with the present invention. The apparatus 10a is similar in construction to the apparatus 10 except that a first compartment 26a of the apparatus 10a is provided with a lid 40 and a second compartment 28a of the apparatus 10a is provided with a lid 42. It should be noted that the lids 40 and 42 of the apparatus 10a are connected to a hopper 12a of the apparatus 10a via a plurality of hinges 44 and 46, respectively, for permitting the lids 40 and 42 to be selectively moved between an open position and a closed position. That is, when the lid 40 is in an open position spent water-based drilling mud can be introduced into the first compartment 26a of the apparatus 10a; and when the lid 42 of the apparatus 10a is in an open position solid and liquid ingredients can be incorporated into the second compartment 28a for mixing with the spent water-based drilling mud disposed therein. While the lids 40 and 42 have been shown connected to the hopper 12a via the hinges 44 and 46, it should be understood that the lids 40 and 42 can be designed for slidable engagement with the hopper 12a or can merely be supported on the hopper 12a so as to selectively close off the first and second compartments 26a and 28a of the hopper 12a.

Since the apparatus 10 and 10a are similar in construction, except for the lids 40 and 42, and their connection to the hopper 12a via the hinges 44 and 46, only the apparatus 10 and the operation of the apparatus 10 will be described in detail hereinafter.

Referring more specifically to FIGS. 3 and 4, the first and second compartments 26 and 28 of the apparatus 10 will be described in more detail, as well as the mud transfer assembly 30 for transferring the spent water-based drilling mud from the first compartment 26 of the apparatus 10 to the second compartment 28 of the apparatus 10. It should be noted that while the first compartment 26 is shown as having a capacity less than about half of the capacity of the second compartment 28 of the apparatus 10, the size of the first compartment 26 relative to the second compartment 28 can be varied widely. However, when the size of the first compartment 26 relative to the second compartment 28 is increased in capacity, it may be desirable to incorporate a valve (not shown) into the mud transfer assembly 30 so as to control the amount of spent water-based drilling mud transferred from the first compartment 26 of the apparatus 10 to the second compartment 28 thereof because of the amount of solid and liquid ingredients mixed with the spent water-based drilling mud in the second compartment 28 to produce indigenous fertile top soil from the spent water-based drilling mud.

As previously stated, the apparatus 10 is provided with the bulk head or partition 24 for separating the first compartment 26 of the apparatus 10 from the second compartment 28 thereof. A floor 48 is provided in the first compartment 26 of the apparatus 10. The floor 48 is disposed a distance 50 from the bottom 16 of the hopper 12 and extends between the first and second sides 20 and 22 of the hopper 12, respectively, and the first end 17 of the hopper 12 and the bulk head or partition 24 so as to provide a chamber 52 below the floor 48 of the first compartment 26.

Figure 6:
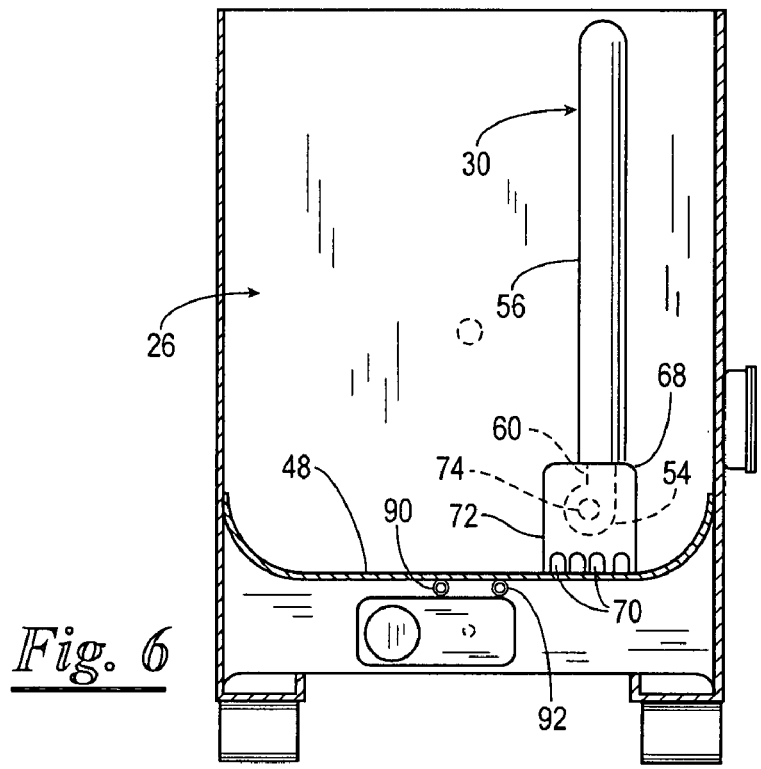
FIG. 6 is a cross sectional view of the apparatus of FIG. 4 taken along the line 6-6 thereof.

As more clearly shown in FIGS. 3 and 6, the mud transfer assembly 30 includes a pump 54 supported on the floor 48 of the first compartment 26 and a transfer conduit 56. One end 58 of the transfer conduit 56 is connected to the pump 54 and in fluid communication with a discharge port 60 of the pump 54. An opposed second end 62 of the transfer conduit 56 is in fluid communication with the second compartment 28 of the hopper 12 via an opening 64 formed through the bulkhead or partition 24 so as to be disposed near an upper end 66 of the bulkhead or partition 24 substantially as shown. The pump 54 can be any conventional pump capable of pumping the spent water-based drilling mud. Further, the pump 54 is connected to a power source in a conventional manner. Thus, no further details or description of the pump 54 and its connection to a power source are believed necessary to enable a person skilled in the art to understand and practice the present invention.

The spent water-based drilling mud treated in the apparatus 10 will generally be filtered and/or screened prior to introduction into the first compartment 26 of the hopper 12 so as to remove any large particulate matter therefrom. However, in situations wherein the spent water-based drilling mud is not filtered or screened, large particulate material may be present in the spent water-based drilling mud disposed in the first compartment 26 of the hopper 12. Thus, the pump 54 may be provided with a cowling 68 having a plurality of openings 70 formed in a lower end 72 thereof which function as filters to prevent large particulate matter and other large objects present in the spent water-based drilling mud from entering an inlet port 74 of the pump 54 and thereby clogging the pump 54.

Upon activation of the pump 54 spent water-based drilling fluid is transferred from the first compartment 26 of the hopper 12 into the second compartment 28 of the hopper 12 for admixture with compost or organic matter, manure, indigenous soil and when required, other additives to lower the sodium chloride content of the spent water-based drilling mud or to add additional enzymes to enhance the breakdown of hydrocarbons which may be present in the spent water-based drilling mud. Referring now to FIGS. 3-5, the mixing assembly 32, which is supported within the second compartment 28 of the hopper 12, includes a shaft 78 which is mounted longitudinally in the second compartment 28 of the hopper 12. The shaft 78 is mounted for rotation and is provided with a plurality of angularly disposed stirring elements or paddles 80 extending radially from the shaft 78 such that upon rotation of the shaft 78, the stirring elements or paddles 80 provide substantially uniform movement of the mixture formed of the spent water-based drilling mud, compost or organic matter, manure, indigenous soil, ion exchange compounds containing soil conditioners and/or gypsum, and when required other additives, in the second compartment 28. The angular disposition of the stirring elements or paddles 80 will vary depending upon the overall configuration of the second compartment 28 of the hopper 12. The only requirement being that the stirring elements or paddles 80 be configured and disposed along the shaft 78 in such a manner as to provide the required agitation of the mixture to provide a substantially homogenous mixture as a result of the substantially uniform movement of the mixture in the second compartment 28 of the hopper 12 during conversion of the spent water-based drilling mud into fertile indigenous top soil.

The shaft 78 can be driven by a motor 82 or any other drive mechanism such as a chain drive system and the like. Further, the motor 82 and the pump 54 can be electrically activated in a conventional manner, or the motor 82 and the pump 54 can be operated via a diesel or gasoline engine. Thus, no further comments concerning the pump 54 or the motor 82 is believed necessary to anyone skilled in the art to understand and practice the present invention.

The dispersing assembly 34 of the apparatus 10 includes the auger 36 supported longitudinally in an air lock chamber 84 defined by a cylinder 86 (FIG. 5) which is supported below the second compartment 28 of the hopper 12. The auger 36 is rotatably mounted in the cylinder 86 so that upon conversion of the spent water-based drilling mud into fertile indigenous top soil and activation of a motor 82 (FIG. 3), the auger 36 is rotated and fertile indigenous top soil is removed from the cylinder 86 via the exit opening 38. It should be noted that the exit opening 38 is provided with a cap 88 (FIGS. 2 and 3) which must be removed prior to discharging indigenous fertile top soil from the cylinder 80 and thus the air lock chamber 84 of the dispersing assembly 34.

Referring now to FIGS. 3, 5 and 6, the apparatus 10 further includes air supply conduits 90 and 92 for supplying compressed air, heated compressed air and/or $O_3$ air (i.e., pure air) at high volumes, into the second compartment 28 of the hopper 12 to substantially saturate the mixture with air and/or enhance enzyme activity on the hydrocarbon components present in the spent water-based drilling mud during conversion of the spent water-based drilling mud into the desired indigenous fertile top soil. Further, the introduction of air into the second compartment 28 of the hopper 12 enhances drying of the indigenous fertile top soil product produced. The air supply conduits 90 and 92 extend lengthwise through the hopper 12 such that a portion of each of the air supply conduits 90 and 92 extending through the chamber 52 in the first compartment 26 of the hopper 12 and a portion of the air supply conduits 90 and 92 containing apertures 94 and 96, respectively, are disposed adjacent an opening 92 of the cylinder 80 at a position so as to not interfere with the rotational movement of the auger 36 when the auger 36 is activated to dispense the indigenous fertile top soil produced in the second compartment 28 of the hopper 12 as hereinforth described. Thus, air supply conduits 90 and 92 are connected to an air supply source 98 (FIG. 1) such as a compressor, a tank or the like so that compressed air can be injected into the second compartment 26 of the hopper 12 to enhance enzyme activity and thus conversion of the spent water-based drilling mud into indigenous fertile top soil in accordance with the present invention. If required due to the ambient temperature at the well site, the compressed air can be treated to a temperature at at least 60° F., and desirably from about 70° to 105° F.

Having described the apparatus 10 which is suitable for the conversion of spent water-based drilling mud into indigenous fertile top soil, the method of converting such spent water-based drilling mud into indigenous fertile top soil will now be described with reference to the drawings.

To convert the spent water-based drilling mud into indigenous fertile top soil, the apparatus 10 is moved to the well site so that the spent water-based drilling mud can be introduced into the first compartment 26 of the hopper 12. The apparatus 10 is provided with skids 14 so that the apparatus 10 can readily be moved to the well site by a vehicle. Once the apparatus 10 is in place, spent water-based drilling mud is transferred from the mud pit or a containment vessel into the first compartment 26 of the hopper 12. Desirably, the spent water-based drilling mud is passed through a filter and/or shaker (not shown) prior to introducing same into the first compartment 26 of the hopper 12 so as to remove any large particulate matter from the spent water-based drilling mud.

The spent water-based drilling mud is analyzed, either while in the mud pit or containment vessel or after it has been transferred into the first compartment 26 of the hopper 12 to determine the amount of solids present in the spent water-based drilling mud, as well as the pH of the spent water-based drilling mud, and to determine the presence of heavy metals, soluble salts, such as sodium chloride, and the total hydrocarbon or petroleum (tph) in the spent water-based drilling mud. The analysis of the spent water based-drilling mud is important because the amount of solids present in the spent water-based drilling mud will determine the amount of the mature compost, organic fertilizer and indigenous top soil admixed with the spent water-based drilling mud and/or the necessity to add additional fresh water and the pH of the spent water-based drilling mud determines what additional components, if any, are necessary in order to convert the spent water-based drilling mud into indigenous fertile top soil. For example, if the pH of the spent water-based drilling mud and/or the mixture resulting from mixing the spent water-based drilling mud with compost, or organic matter, and/or organic manure (e. g., cow manure, chicken manure and hog manure), and indigenous soil in the second compartment 28 of the hopper 12 is less than 7, an effective amount of a natural material, such as lime (CaO), potassium hydroxide (KOH), and the like is incorporated into either the spent water-based drilling mud prior to transferring same into the second compartment 28, or into the mixture resulting by admixing the spent water-based drilling mud with compost or organic matter, manure and indigenous soil. Preferably, the pH of the spent water-based drilling mud is determined after the spent water-based drilling mud has been transferred from the first compartment 26 of the hopper 12 to the second compartment 28 so that the pH of the mixture produced in the second compartment 28 of the hopper 12 has a pH of at least 7, and preferably from about 7.5 to about 9.

It should be noted that by adjusting the pH to a desired range that any heavy metals present in the spent water-based drilling mud and thus the mixture in the second compartment 28 of the hopper 12, bind to clay particles and insure that such heavy metals do not become water-soluble.

Methods of measuring the solid content of the spent water-based drilling mud and for determining the presence of heavy metals in the spent water-based drilling mud, and/or the mixture of components including the spent water-based drilling mud in the second compartment 28 of the hopper 12 are well known. Thus no further comments or discussion concerning the analysis of the spent water-based drilling mud and/or the mixture in the second compartment 28 of the hopper 12 for presence of heavy metals is believed necessary to enable one skilled in the art to understand and practice the present invention.

The spent water-based drilling mud in the mixture contained in the second compartment 28 of the hopper 12 is analyzed for soluble salts such as sodium chloride via the comprehensive salt test. As will be described in more detail hereinafter, certain additives can be incorporated into the mixture contained within the second compartment 28 of the hopper 12 to reduce the level of soluble salt content present in fertile indigenous top soil produced in accordance with the present invention.

To convert the spent water-based drilling mud into indigenous fertile top soil, effective amounts of drilling mud, mature compost, and organic matter (e.g. animal manure such as cow manure, pig manure, chicken manure, and the like), ion exchange compounds containing soil conditioners and/or gypsum, and indigenous soil are introduced into the second compartment 28 of the hopper 12. The amount of each component can vary. However, the mixture desirably contains an effective amount of spent water-based drilling mud, from about 30 to 150 volume percent compost, from about 5 to about 20 volume percent dry organic manure and from about 5 to 20 volume percent indigenous soil, based on the total volume of the mixture. If heavy metals are present in the spent water-based drilling mud it may be desirable to incorporate from about 5 to 15 volume percent of a material, such as gypsum, which is capable of reducing the adhesive characteristic of the clay particles and thereby insuring that the heavy metals remain bound to the clay and soil particles. When it is determined that the level of soluble salts in the spent water-based drilling mud, and thus the mixture containing such drilling mud, is undesirable, the amount of such soluble salts can be reduced by incorporation of the aforementioned gypsum (calcium sulfate) and/or by incorporation of ion exchange compounds containing soil conditioners wherein the ion exchange compounds contain nitrogen, calcium, magnesium minerals and combinations thereof which are capable of displaying and bonding chloride ions absorbed on the surface of clay minerals colloids present in the spent water-based drilling mud. An example of such a commercially available ion exchange compound and soil conditioner is Nitracal-100™ and Nitracal-SC™ offered by SPL Control, L.L.C. of Elmore City, Okla.

In formulating the mixture, care should be exercised to ensure that the compost is mature compost to prevent an endothermic reaction which would heat the fertile indigenous top soil produced to a temperature beyond healthy temperature for plant growth and seed germination.

The addition of dry organic manure not only increases the presence of nitrogen in the fertile indigenous top solid produced in accordance with the present invention, but also introduces new microbes and enzymes into the resulting soil product. The incorporation of the indigenous top soil provides the soil produced from the spent water-based drilling mud with the same microorganisms and enzymes as the soil surrounding the well site. The mature compost function as organic food for the microorganisms and the nitrogen from the dry organic manure speeds up the multiplication or growth of the microorganisms or microbes which are present in spent water-based drilling mud. In the event the mixture becomes to viscose, fresh water may be added to the mixture to enhance mixing.

In most instances, the microorganisms and enzymes present in the indigenous top soil are sufficient to degrade or metabolize any hydrocarbon or petroleum products present in the spent water-based drilling mud. However, if it is determined that additional enzymes should be added, various types of enzymes and/or micro-organisms capable of degrading the hydrocarbon and petroleum products which are well known in the art can be employed.

The mixture present in the second compartment 28 of the hopper 12 is thoroughly mixed via the stirring elements or paddles 80 so that substantially uniform movement of the mixture is provided throughout the second compartment 28 of the hopper 12 whereby a substantially homogenous mixture or slurry is formed. Thereafter, in order to further activate the enzymes, compressed air, heated compressed air or $O_3$ (i.e. pure air), may be injected into the mixture via the apertures 94 and 96 of the air supply conduits 90 and 92, respectively. The air is desirably maintained at a temperature of at least 60° F., and preferably from about 70° F. to about 105° F. However, care should be exercised to ensure that the temperature of the air is not sufficient to heat the mixture contained in the second compartment 28 of the hopper 12 to a temperature sufficient to kill or destroy any enzyme activity of the mixture.

Depending on the solid or clay content of the spent water-based drilling mud, it may be desirable to incorporate into the mixture an effective amount of gypsum, i.e., and/or ion exchange compounds containing soil conditioners from. The effective amount of gypsum and/or ion exchange compounds containing soil conditioners can vary widely depending upon the composition of the spent water-based drilling mud. However, the amount of gypsum and/or ion exchange compounds containing soil conditioners will generally be present in an amount of about 5 to 15 percent by volume, based on the volume of the spent water-based drilling mud. The gypsum reduces the adhesive properties of the clay thereby increasing the distance between the clay particles so that chloride ions can be removed by the ion exchange compounds. Further, the sodium can migrate throughout the fertile indigenous top soil produced in accordance with the present invention and thus, prevent destruction or burning of the roots and seeds of plants planted in such soil.

Once it is determined that the spent water-based drilling mud has been converted into indigenous fertile top soil, the air can be continued to be supplied into the second compartment 28 of the hopper 12 until the fertile indigenous top soil is in a semi-dried state. Thereafter, the flow of air is ceased, and the cap 88 is removed so that the exit opening 38 of the cylinder 86 is in an open condition. The auger 36 is then activated and the semi-dried fertile indigenous top soil produced from the spent water-based drilling mud is removed from the second compartment 28 of the hopper 12 and analyzed to determine the salt profile of such soil. The dried, fertile indigenous top soil so produced can be used in agricultural purposes at the location of the well or at other sites.

In order to further explain the present invention, the following example is set forth. However, it is to be understood that the example is for illustrative purposes and are not intended to limit the scope of the present invention.

EXAMPLE

Spent water-based drilling mud was collected from three different well locations in the Anadarko basin. These wells represent the true character of the contaminate profile of water-based drilling mud used at those three specific well locations. The waste drilling mud from each location was mixed to form a fertile indigenous top soil containing 70 volume percent commercial compost, 20 volume percent cow manure, 5 volume percent sand, 10 volume percent gypsum, and 20 volume percent indigenous top soil to form a substantially uniform mixture. The soil was then taken to Oklahoma State University at Oklahoma City, Okla. Seeds of native grasses and small plants were germinated and grown in the samples of the indigenous top soil produced from the water-based drilling mud. The seeds of the native grasses and small plants were planted in the indigenous top soil produced using the spent water-based drilling muds are growing and the tomato plants are producing beautiful and delicious tomatoes. It should be noted that there wasn't anything that was taken out of the drilling mud waste to make the fertile indigenous top soil, it was added. This example clearly shows that the liquid and solid waste from drilling oil and gas wells does not have to leave the location but can be turned into fertile indigenous top soil within a few hours and used to grow any native commercial crop or vegetation. The top soil is complete in and of itself; not just a soil additive or conditioner. Thus, the soil can start, sustain and bear beautiful edible fruit. Each well sites top soil has the same microorganisms and enzymes as in the surrounding soil where the well was drilled. Further, the top soil made from the spent water-based drilling muds will have both mineral and organic fertility, greater enzyme activity surrounded by organic food and genetically the same microorganisms and enzymes as the surrounding soil at each well site, thereby resulting in more fertile indigenous top soil, capable of growing a better grade of vegetation than around the well site.

It should be understood that the method and apparatus employed in the conversion of spent water-based drilling mud into fertile indigenous top soil can incorporate additional steps, features or even ingredients for improving the overall composition and properties of the fertile indigenous top soil produced from the spent water-based drilling mud. In addition, it should be noted that changes may be made in the construction and operation of the apparatus, elements, assemblies and in the step or steps or sequence of steps of the methods described herein without departing from the spirit and scope of the invention as defined in the following claims.

What is claimed is:

1. A method for producing fertile indigenous top soil at a well site employing spent water-based drilling mud recovered at the well site wherein the fertile indigenous top soil possesses similar microbial and enzyme characteristics as soil at the well site, the method comprising the steps of:
providing an apparatus having a hopper, the hopper provided with at least one compartment having a mixing assembly, at least one air supply conduit for supplying air into the at least one compartment; and a discharge assembly for removing the fertile indigenous top soil from the at least one first compartment;

moving the apparatus to a position near the well site;

admixing effective amounts of spent water-based drilling mud, mature compost, organic fertilizer, and top soil in the at least one compartment of the hopper to provide a mixture having a pH in the range of from about 7 to about 9.5, the mixture containing spent water-based drilling mud, from about 30 to about 150 volume percent mature compost, from about 5 to 20 volume percent organic fertilizer, and from about 5 to 20 volume percent top soil from the well site wherein each of the volume percent is based on the volume of the spent water-based drilling mud present in the mixture;

admixing from about 5 to about 15 volume percent gypsum, based on the volume of spent water-based drilling mud present, into the mixture so as to break up and reduce adhesive characteristics of clay particles present in the spent water-based drilling mud;

activating the mixing assembly so as to stir the mixture for a period of time effective to form a substantially homogenous mixture;

drying the substantially homogenous mixture so as to produce fertile indigenous top soil possessing similar microbial and enzyme characteristics as the top soil surrounding the well site; and removing the fertile indigenous top soil from the at least one compartment of the hopper.

2. A method for producing fertile indigenous top soil at a well site employing spent water-based drilling mud recovered at the well site wherein the fertile indigenous top soil possesses similar microbial and enzyme characteristics as soil at the well site, the method comprising the steps of:

providing an apparatus having a hopper, the hopper provided with at least one compartment having a mixing assembly and at least one air supply conduit for supplying air into the at least one compartment;

moving the apparatus to a position near the well site;

admixing effective amounts of spent water-based drilling mud, mature compost, organic fertilizer, and top soil in the at least one compartment of the hopper to provide a mixture containing spent water-based drilling mud, from about 30 to about 150 volume percent mature compost, from about 5 to 20 volume percent organic fertilizer, and from about 5 to 20 volume percent top soil from the well site wherein each of the volume percent is based on the volume of the spent water-based drilling mud present in the mixture;

admixing from about 5 to about 15 volume percent gypsum, based on the volume of spent water-based drilling mud present, into the mixture so as to break up and reduce adhesive characteristics of clay particles present in the spent water-based drilling mud;

activating the mixing assembly so as to stir the mixture for a period of time effective to form a substantially homogenous mixture;

drying the substantially homogenous mixture so as to produce fertile indigenous top soil possessing similar microbial and enzyme characteristics as the top soil surrounding the well site; and removing the fertile indigenous top soil from the at least one compartment of the hopper.

3. The method of claim 2 wherein the mixture is maintained at a pH in a range of from about 7 to about 9.5.

4. A method for producing fertile indigenous top soil at a well site employing spent water-based drilling mud recovered at the well site wherein the fertile indigenous top soil possesses similar microbial and enzyme characteristics as soil at the well site, the method comprising the steps of:

providing an apparatus having a hopper, the hopper provided with at least one compartment having a mixing assembly and at least one air supply conduit for supplying air into the at least one compartment;

moving the apparatus to a position near the well site;

admixing effective amounts of spent water-based drilling mud, mature compost, organic fertilizer, and top soil in the at least one compartment of the hopper to provide a mixture containing spent water-based drilling mud, from about 30 to about 150 volume percent mature compost, from about 5 to 20 volume percent organic fertilizer, and from about 5 to 20 volume percent top soil from the well site wherein each of the volume percent is based on the volume of the spent water-based drilling mud present in the mixture;

admixing from about 5 to about 15 volume percent gypsum, based on the volume of spent water-based drilling mud present, into the mixture so as to break up and reduce adhesive characteristics of clay particles present in the spent water-based drilling mud;

activating the mixing assembly so as to stir the mixture for a period of time effective to form a substantially homogenous mixture;

injecting an effective amount of air into the mixture to enhance enzyme and microbial activity on hydrocarbons components present in the spent water-based drilling mud, wherein the air is injected into the mixture at a temperature of from about 70 to about 105° F. and in an amount and at a velocity sufficient to dry the mixture and thereby as provided the fertile indigenous top soil; and removing the fertile indigenous top soil from at least on a compartment of the hopper.

* * * * *